United States Patent
Schaal et al.

(12)

(10) Patent No.: US 6,333,928 B1
(45) Date of Patent: Dec. 25, 2001

(54) INTEGRATED MULTIMEDIA TELECOMMUNICATIONS SERVER

(75) Inventors: Denis Schaal, Eckbolsheim; Pierre Bohn, Eschau, both of (FR)

(73) Assignee: Societe Alsacienne et Lorraine de Telecommunications et d'Electronique Al, S.A., Wolfisheim (FR)

( * ) Notice: Subject to any disclaimer, the term of this patent is extended or adjusted under 35 U.S.C. 154(b) by 0 days.

(21) Appl. No.: 09/192,939

(22) Filed: Nov. 16, 1998

(30) Foreign Application Priority Data

Nov. 14, 1997 (FR) .................................................. 97 14475

(51) Int. Cl.[7] ........................... H04L 12/50; H04Q 11/00
(52) U.S. Cl. .............................. 370/360; 709/107; 712/32
(58) Field of Search ................................. 370/360, 351, 370/352, 353, 354, 359, 259, 260, 264, 265, 395, 465, 466, 467, 386; 709/202, 203, 106, 107; 712/32, 33, 36, 37, 39

(56) References Cited

U.S. PATENT DOCUMENTS

| 5,604,737 | 2/1997 | Iwami et al. . |
| 5,612,897 | 3/1997 | Rege . |
| 5,930,493 | * 7/1999 | Ottesen et al. ........................... 725/92 |
| 5,943,321 | * 8/1999 | St-Hilaire et al. ..................... 370/259 |
| 5,974,469 | * 10/1999 | Shoji et al. ............................ 709/313 |
| 6,085,221 | * 7/2000 | Graf ....................................... 709/202 |
| 6,163,796 | * 12/2000 | Yokomizo ............................... 709/203 |

FOREIGN PATENT DOCUMENTS

| 0 696 124 | 2/1996 | (EP) . |
| 0 732 835 | 9/1996 | (EP) . |

OTHER PUBLICATIONS

Kent Elliott, "Gateways to the Telephone cloud", pp. 41–42, Telecommunications, Apr. 1997.

* cited by examiner

Primary Examiner—Alpus H. Hsu
Assistant Examiner—Brian Nguyen
(74) Attorney, Agent, or Firm—Young & Thompson

(57) ABSTRACT

The present invention has for its object a telecommunication server for enterprises or like structures.

Server characterized in that it is principally constituted, on the one hand, by a central switching assembly (2) comprising a management module (3) with a non-dedicated microprocessor (3') serving as the support for a standard multitasking computer operating system supervising in real time the switching of multiplexed frames, a module (4) forming a switching matrix in real time for digital channels and a module (5) for transfer of voice messages, interconnected by at least one link or internal bus (6, 6', 6") for communication and transfer, on the other hand by modules (7) interfacing with lines (8, 9, 10, 11) for analog and/or digital transmission and/or with one or more links or buses (12) of computer networks, internal to the enterprise and, finally, by modules (13) interfacing with transmission lines (14, 15) connected to the public communication networks, analog (14') and digital (15'), these modules being integrated into a single structural assembly.

8 Claims, 6 Drawing Sheets

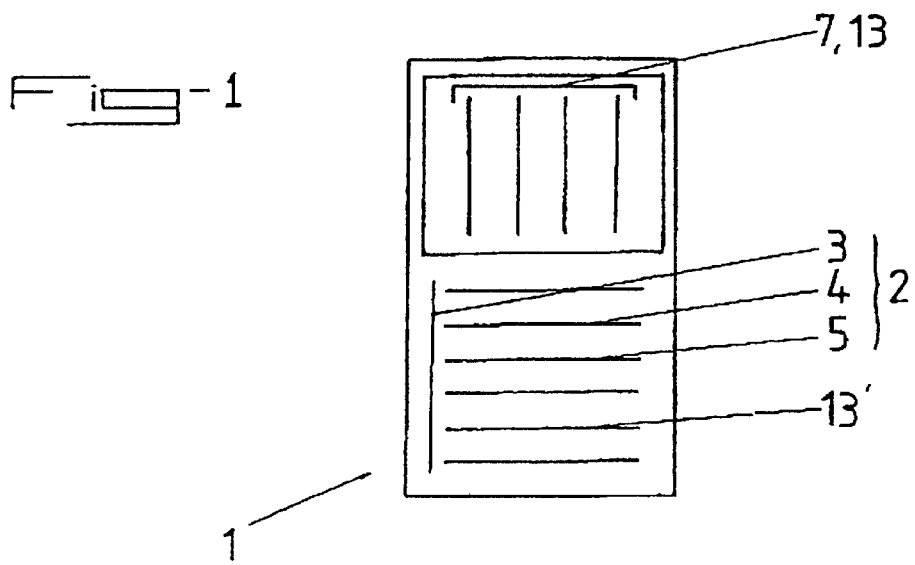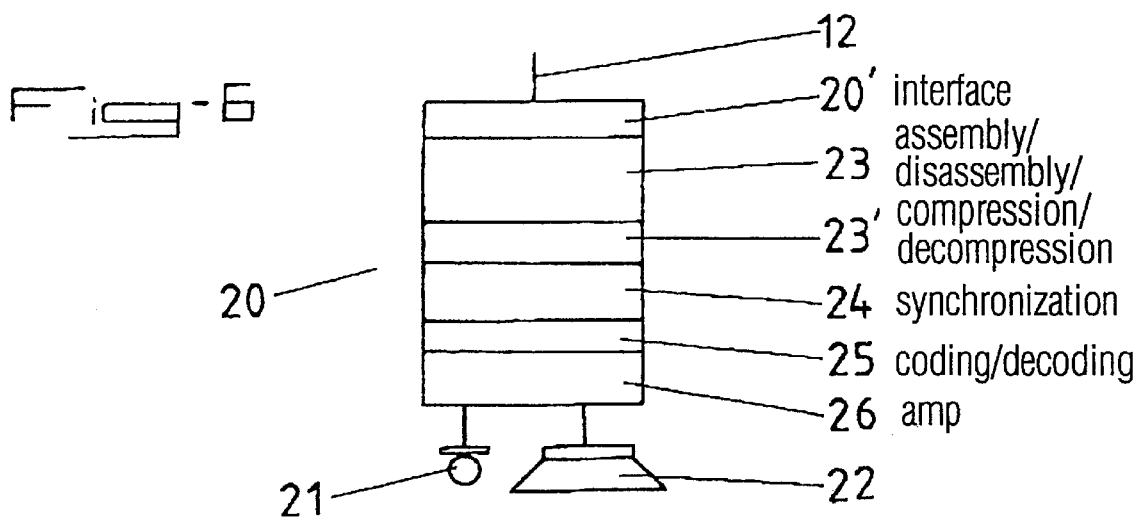

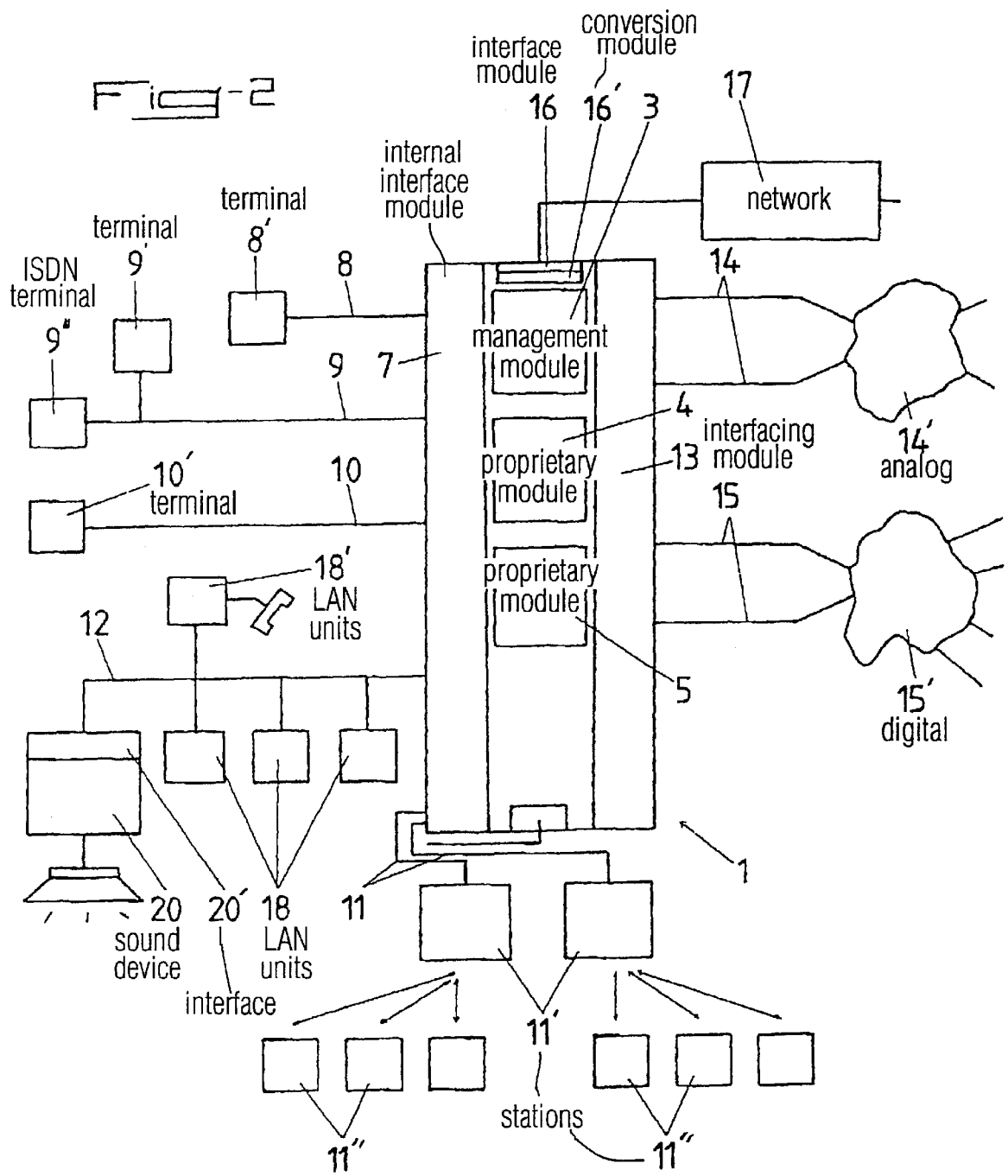

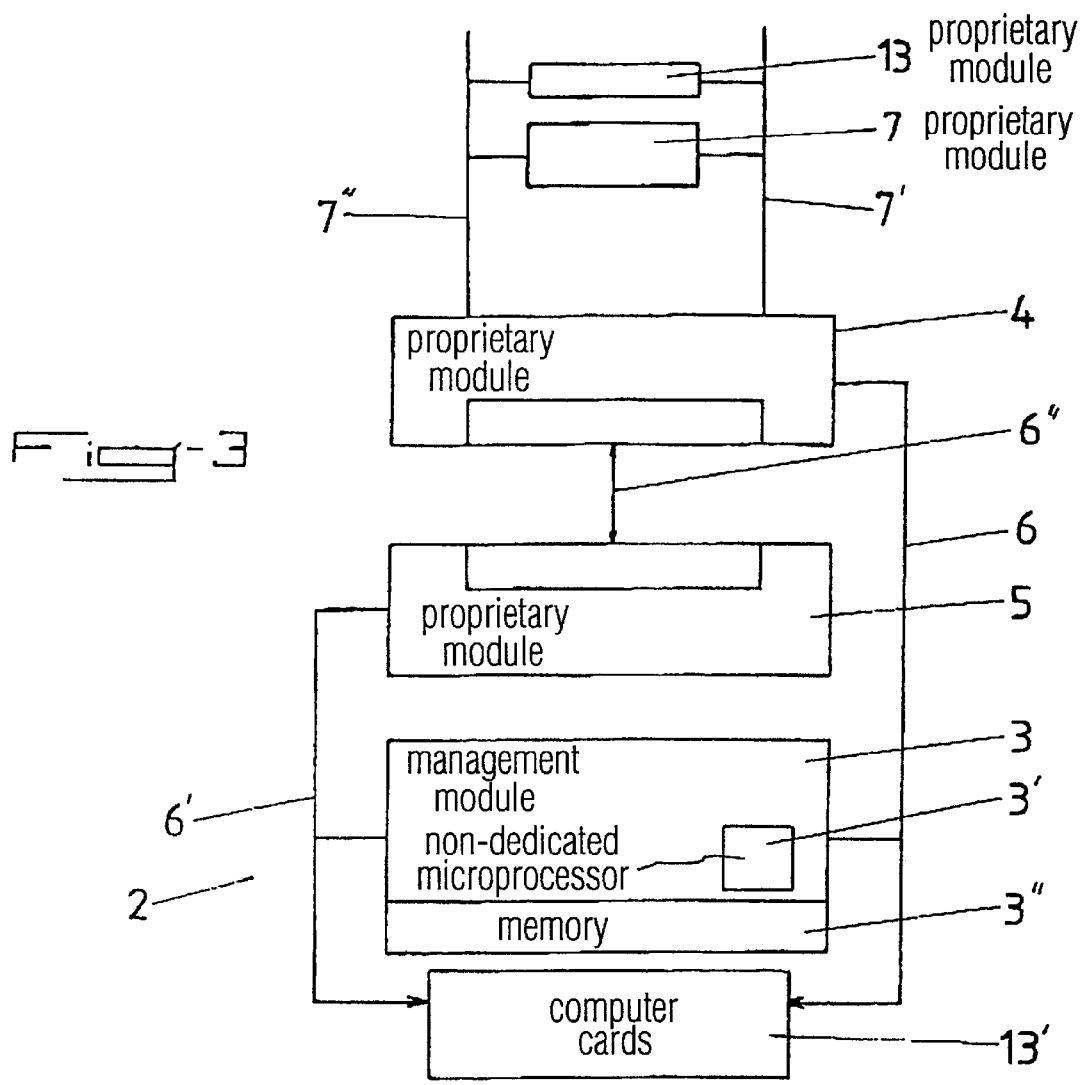
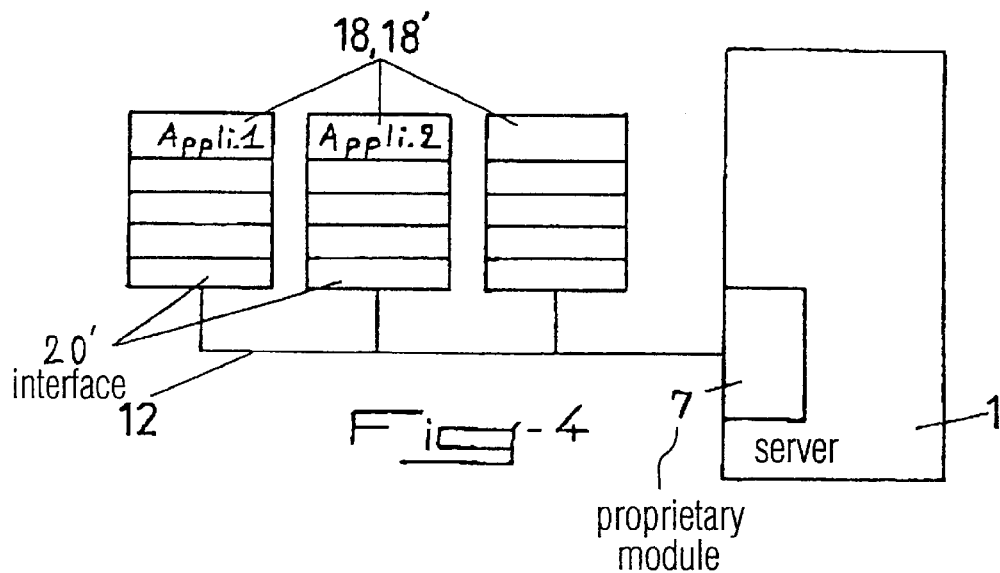

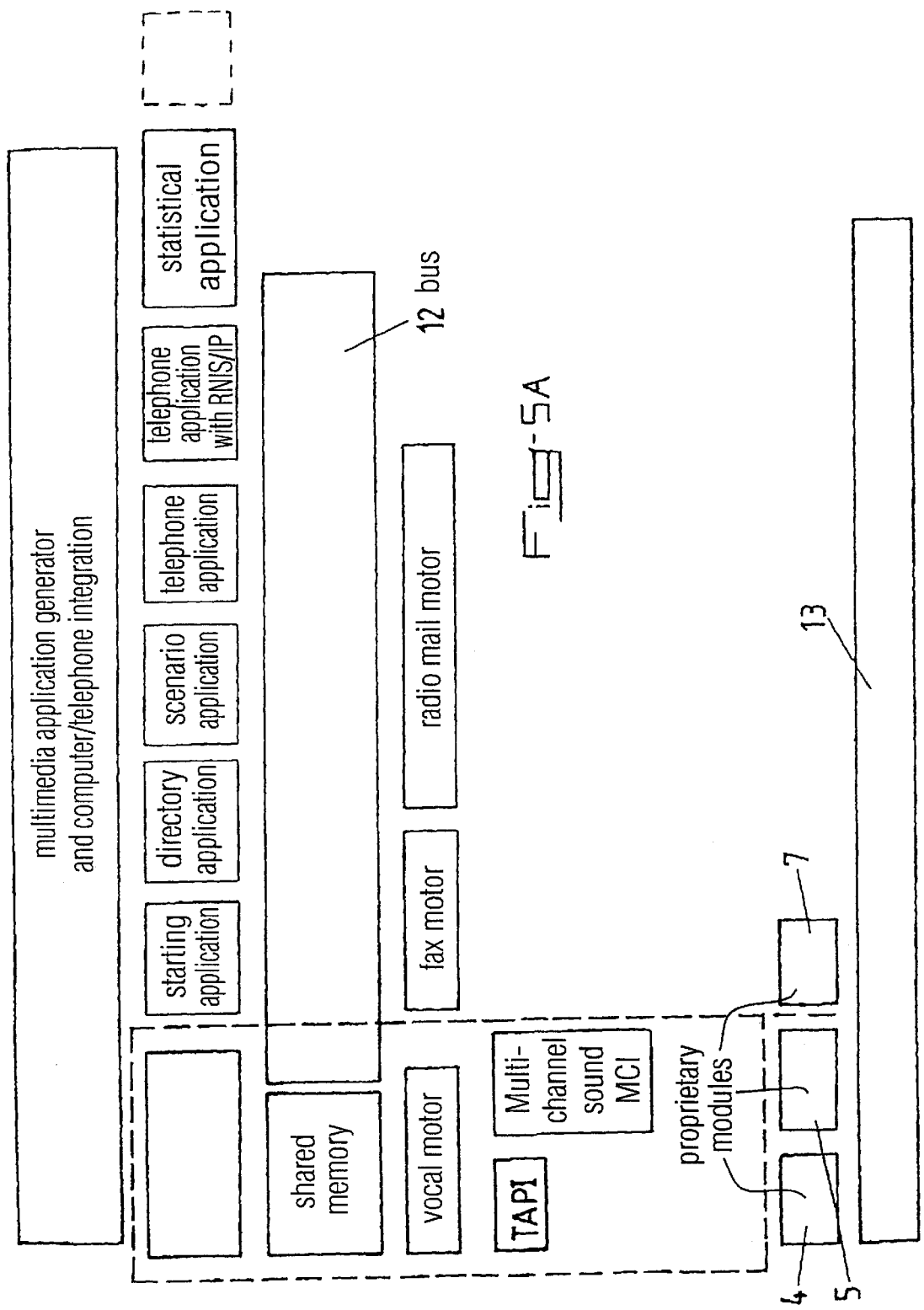

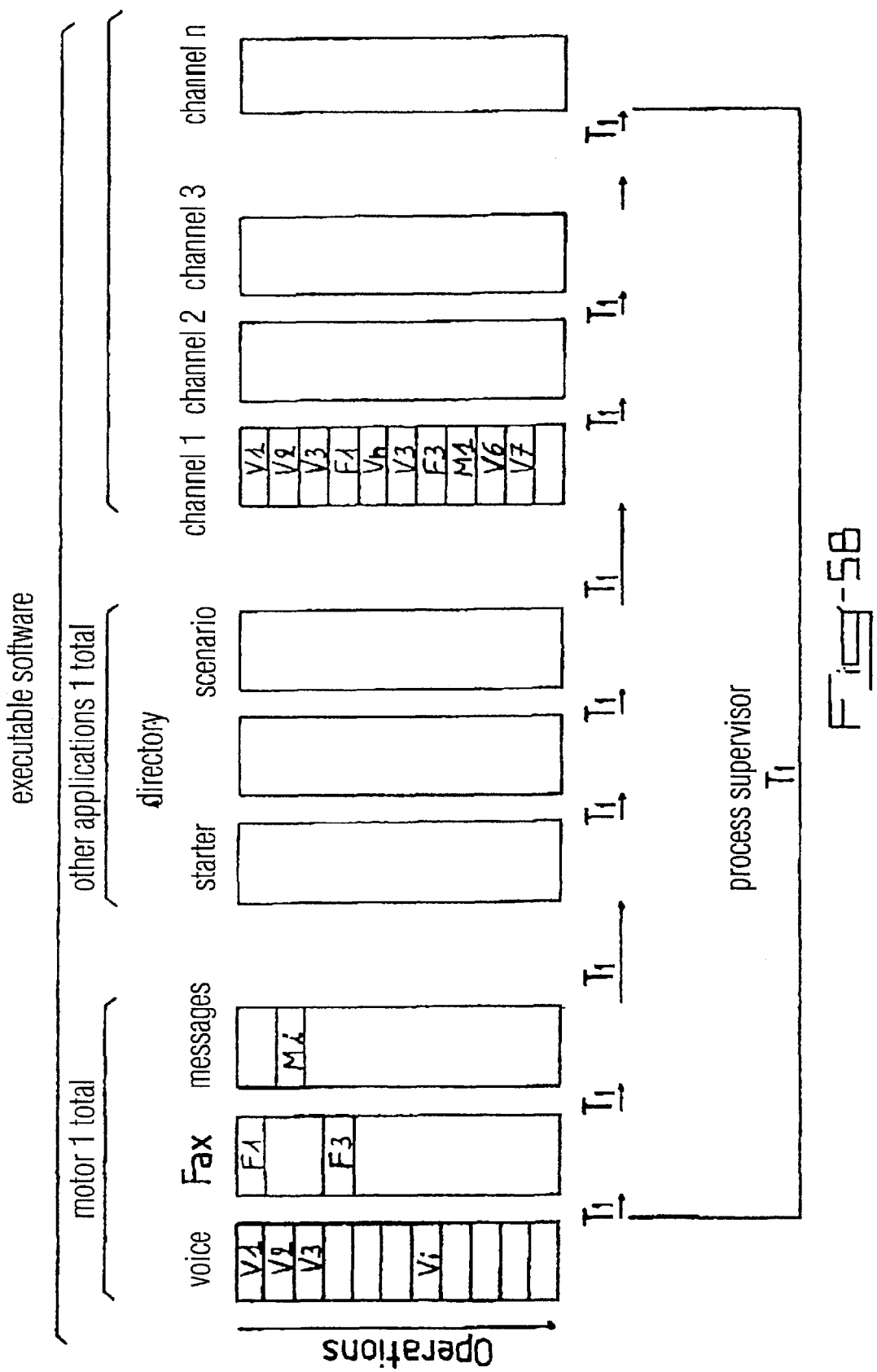

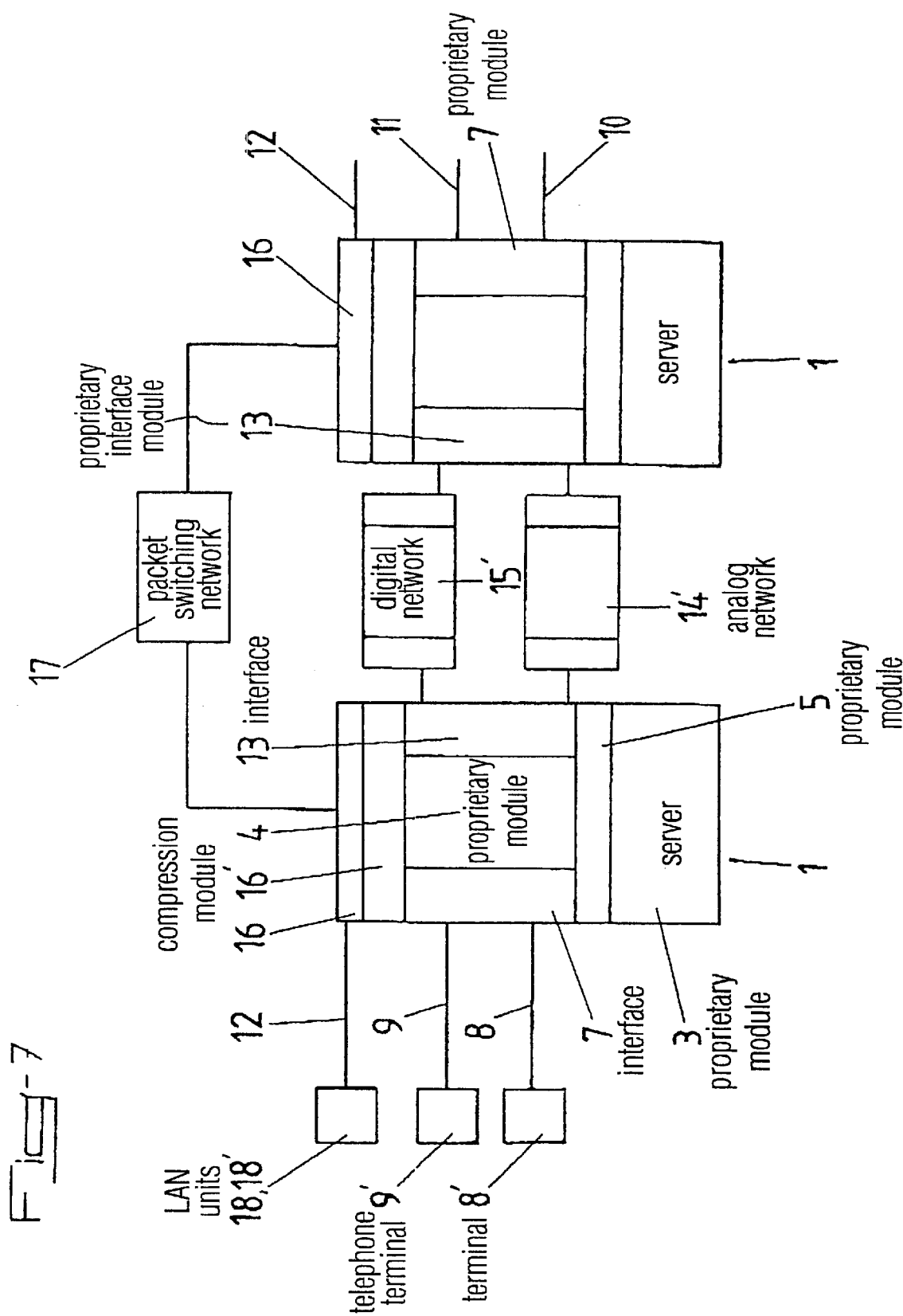

INTEGRATED MULTIMEDIA TELECOMMUNICATIONS SERVER

BACKGROUND OF THE INVENTION

The present invention relates to the field of computers and communication, particularly communication between an enterprise and the outside world, using a plurality of different means and modes of communication, and has for its object a multimedia telecommunication server for an enterprise or an analogous entity.

The present invention relates more particularly to a telecommunication server permitting the interconnection of a plurality of voice and internal computer communication equipments to an enterprise or a work site and their connection, on the one hand, to public networks such as an analog switched telephone network PSTN (Public Switching Telephone Network), a digital switched network for integration of ISDN services (for example French Numeris Network), or a packet switching network for transport of data by packets (for example Transpac X25 or Internet) and, on the other hand, to private networks such as for example those constituted by digital or analog leased lines, networks internal to an enterprise, Local Area Network (LAN) (for example of the Ethernet type) or else networks for the transmission of data by packets (for example of the Intranet type or of the type using the communication protocol X25).

DESCRIPTION OF THE RELATED ART

There already exist different devices ensuring in part or in whole the interconnection of the various equipments indicated above, each of them, however, having one or several drawbacks or one or several limitations.

Thus, it is known to interconnect a computer server and a PBX (Private Branch Exchange) by means of a bidirectional exchange connection controlled by a suitable communication protocol.

However, such a hybrid construction requires recourse to an external computer unit to control and supervise said interconnection of communication paths. This necessarily implies the provision and use of an interconnection protocol between the two systems (for example of the CSTA or SCAI type), which slows executions and increases the workload of the central unit of the computer server.

There are also already known integrated interconnection devices based on a specific material structure in the form of a card or a specific central unit with real time switching and/or based on specific use of additional real time-call processing software.

As a result, the development times to create applications and an embodiment of said development by the sole specialists in the proprietary system, are increased. Moreover, the functions and services that can be provided by specific systems are limited by the capacities of the material (memory, central unit) and of the particular software installed and used, which do not develop as rapidly as the standard software and materials.

SUMMARY OF THE INVENTION

The object of the present invention is to overcome the various aforementioned drawbacks and to provide a multimedia telecommunication server, ensuring simultaneously operations of the computer server type and functions of the PBX type and adapted to carry out the interconnection of at least the different aforementioned equipment and communication supports, whilst having a material and software structure based on standard elements, combined in a new and advantageous manner.

Moreover, another object is to be able to permit the simultaneous execution of several independent applications by said telecommunication server, without substantially decreasing the quality of execution of each of said applications.

To this end, the present invention has for its object a telecommunication server for an enterprise or like entity, characterized in that it is principally constituted, on the one hand, by a central switching assembly comprising a management module with an undedicated microprocessor serving to support a standard multi-tasking computer operating system, supervising in real time the switchings of the multiplexed frames, a module forming a real time switching matrix for digital channels and a transfer module for voice messages, interconnected by at least one link or internal bus for communication and transfer, on the other hand, by modules interfacing with analog and/or digital transmission lines and/or with one or more links or buses of computer networks, internal to the enterprise, and, finally, by modules interfacing with transmission lines connected to the digital and analog public communication networks, said modules being integrated into a single structural assembly.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 1 is a schematic representation of one preferred material embodiment of the telecommunication server according to the invention;

FIG. 2 is a synoptic diagram showing various possible internal and external connections for the server according to the invention;

FIG. 3 is a synoptic scheme showing one example of construction of the switching assembly forming a part of the server according to the invention;

FIG. 4 is a fragmentary synoptic scheme showing the shared processing of software executable applications by computer units connected to the telecommunication server;

FIG. 5A is a synoptic diagram showing the software architecture of the server according to the invention, in relation to its constituent material elements;

FIG. 5B is a schematic representation showing different executable software and their operational relationships;

FIG. 6 is a synoptic diagram of a device for sound and voice production and room surveillance that can be associated with a server according to the invention, and, FIG. 7 is a synoptic diagram of a voice telecommunication network, using digital voice packets between at least two enterprises using servers according to the invention.

DESCRIPTION OF THE PREFERRED EMBODIMENTS

According to the invention, and as shown particularly in FIGS. 1–3 of the accompanying drawings, the telecommunication server 1 is principally constituted, on the one hand, by a central switching assembly 2 performing real time channel switching transporting multiplexed data of the PCM (pulse coded modulation) type, of the digitized channel type and of the data type, comprising a management module for controlling and monitoring 3 with a non-dedicated microprocessor 3' (for example of the Pentium type - trademark) serving as a platform for a standard multitasking computer operating system (for example of the Windows NT type - trademark), a proprietary module 4 forming a real time switching matrix of digital channels associated with suitable clocks and a proprietary module 5 for transfer of voice messages, interconnected by at least one internal bus or connector 6, 6' or 6" for switching and transfer, on the other hand, by proprietary modules 7 interfacing with lines 8, 9, 10, 11 for analog and/or digital transmission and/or with one or more links or buses 12 of a computer network, internal to the enterprise, and, finally, by proprietary modules 13 interfacing with transmission lines 14, 15 connected to the public communication network, analog 14' and digital 15', said modules being integrated into a single structural assembly.

The server 1, preferably of completely integrated material and software structure, relies on a judicious combination of standard elements, for capacity-extension (memory), power (central unit) and as to number and types of functions (call handling system).

The aforementioned different modules can, for example, be implanted in a single standard chassis of the "tower" type, the standard modules 3 and the proprietary modules 4 and 5 being implanted in standard computer cards (for example with the format PC IBM PCI, ISA . . . ) preferably interconnected by a bus of the type ISA (for modules 3, 4 and 5), by a bus of the type PCI (for modules 3 and 5) and by a bus of the MVIP type, associated with corresponding interfaces (for the modules 4 and 5), as shown by way of illustrative example in FIG. 3 of the accompanying drawings.

However, the modules 4 and 5 could also be, as the case may be, gathered on a single card.

Said "tower" chassis could also receive other cards specific to the user and assuring diverse particular functions, for example for telecommunication interfacing, data processing and signal processing or other computer functions.

The module or the card 3 for management, control and supervision will also serve as a platform for the multimedia software applications generator and for computer/telephony integration (CTI), as well as if desired for specific proprietary applications for the user in question.

Moreover, as shown in FIG. 3 of the accompanying drawings, the interfacial modules 7 and 13, gathered on one or several cards, are connected to the central switching assembly 2, for example by means of a signalling bus 7' and a multiplexed data transmission bus 7".

Moreover, such chassis of the telecommunication server 1 could also receive additional extension computer cards 13' having a suitable format (cards with a PC format).

As shown in FIG. 2 of the accompanying drawings, the internal interfacial modules 7 could, for example, ensure the connection of the server 1 with one of several Z-wire analog lines 8, each with at least one corresponding terminal 8', with one of several transmission lines 9 of the BRI type, each connected to at least one terminal 9' of the "data" type and/or to at least one ISDN terminal 9" (for example an ISDN telephone), and at least one line 10 of the V24-X25 type connected to a terminal 10' of the "data" type, with at least one line 12 for computer communication (for example of the Ethernet type) connected to a local computer network assembling several units 18, 18' and/or with at least one device 20 for sound and voice production room surveillance or else with transmission lines 11 connected to stations 11' for communication by radio link (for example radio transmission stations or HF communication stations of the DECT, GSM or other type), which can communicate with distant units 11" that can be movable or not.

The external interfacial modules 13 will comprise particularly interfaces permitting and ensuring the connection of the telecommunication server 1 with a PSTN network 14' by means of analog lines 14 that are leased or not (network line, private line) and with a public ISDN network 15' by means of digital lines (for example lines of the BRI, PRI(T2) type, or the like).

As shown in FIGS. 2 and 7 of the accompanying drawings, the server 1 also comprises an interface module 16 (for example an interface of the TCP/IP type) with at least one packet switching network (for example a public network of the Internet type or a private network of the Intranet type), associated with a module 16' for bi-directional conversion of multiplexed circuit switched voice frames into packet switched voice frames formed for example by one or several signal processors associated with a hardware switching matrix.

According to one characteristic of the invention, the module 5 for transfer of voice messages searches, transfers and/or processes, in an automatic and autonomous manner, the files with "sound" content, as a function of instructions stored in a memory 3" for signalling and control of the microprocessor 3' of the managing unit 3.

Said module 5 for transfer of voice messages for conversion of voice protocol, thus ensures reading and writing the transfer by in bursts (for example of the type known by the designation DMA-direct memory access) the files with a "sound" content are adapted for audio applications with the RAM associated with the microprocessor 3' or by the mass memory of the control module 3. The aforementioned files (for example stored on CD-ROM or disks) thus become directly accessible for use in the course of an application execution and thereby avoid requiring the exploitation system to make copies of "sound" blocks toward the module 5 for transfer of voice messages.

The file transfer mentioned above, operated by the module 5, without relying on the microprocessor 3', is triggered as a function of the instructions contained in a memory 3' for signalling and control of the microprocessor 3'.

Thus, said memory 3" comprises a "data" zone constituting a sort of buffer zone connected to a low frequency trunk and a "signalling" zone, the two zones operating as mailboxes.

As a result, the microprocessor 3' and the user system are relieved of heavy workload (copies, conversion and transfer of files with voice finality) leading to an increase of the availability of said microprocessor to execute other tasks.

According to one preferred characteristic of the invention, shown in FIGS. 5A and 5B of the accompanying drawings, the executable software used by said server 1 under the control of the multi-tasking operating system, comprises on the one part predefined applications (also called "engines" hereinafter), particularly an application ("voice engine") assuring the processing and control of internal lines 8, 9, 10, 11, 12 and external lines 14, 15 in relation to the different interfacial modules 7, 13 for data and/or voice communication, in response to external or internal requests, on the other hand, programmable applications (hereinafter called "software applications") adapted to the specifications of the user and executed either internally by said server 1, or externally by one of several suitable computer units 18 connected to said server 1, by relying on predetermined applications (engines), and, finally, by tree structured voice channels (constituting also applications), of which each is made up of a succession of internal operations of the voice or telephonic type, and of external operations based on requests and/or awaited actions, these tree structured channels being adapted to be triggered and stopped independently of each other.

The engines can comprise, in addition to the voice engine, for example also a fax engine (processing demands for emission and reception of faxes) and a radio message engine (processing demands for emission and reception of radio messages).

The software to be used can comprise for example a database of persons to be called up, of control applications for surveillance modules, a historical and statistical module, applications for sound messages broadcasting, applications for internal interphone, or the like.

Preferably, the different executable files communicate with each other by means of an intertasking communication software interface (also designated API), preferably the interface of the network type known as "NetBios", and telephonic oriented software interfaces (for example TAPI) and voice application oriented software interfaces (for example MCI) and are used, as the case may be in parallel, partially or entirely by said server 1 or by at least one computer unit 18 or a PC adapted and connected to said server 1 by a connection or a communication bus 12 forming a portion of a local computer network connected to said server 1, for example of the type known by the designation Ethernet.

Thus it is possible if necessary to distribute the various tasks to be executed and to cause to operate each engine in each application software on a different external computer unit 18 interconnected to each other and to the server 1 by a dedicated line, such as for example an Ethernet line (see FIG. 4).

The advantage of choice of the NetBios type network also consists in a reduction of the tiresome work of configuring the computer units 18 to be connected, the configuration of each unit carrying out in a dynamic and automatic manner the execution of the various software programs.

Moreover, instead of doing everything in a single application (for example the voice engine), the processing can be distributed (see FIG. 5B). Each tree structure is not simply constituted by a memory structure or interpreted operations loaded from a disk, but is a true application in the proper sense of the term, the "long" operations being carried out by the tree structure itself.

Thus, when functioning under a multi-tasking operating system as is the case for the telecommunications server 1 of the present invention, the exploitation system's supervisor of processing automatically and equitably distributes the running time of the central unit between the set of applications to be carried out. The only task slowed down is therefore the task which emitted the "long" request.

Moreover, the tree structures of the telecommunication server are true compiled applications, which already permit each among themselves to use a whole set of the APIs placed at their disposition by the subjacent multi-tasking operating system (SQL connection, Internet, network message dispatch, screen display, . . . ), and also permits starting and/or stopping in a natural way each of the channels separately, without influence on the operation of the other channels or on the voice engine, as shown in FIG. 5A.

The roles and interaction of the different executable software will be explained, by way of example, more particularly hereafter, with reference to FIGS. 5A and 5B.

A voice tree structure is typically constituted by a set of requests, principally voice (Vi in FIG. 5B), but also fax (Fi in FIG. 5B) and messages (Mi in FIG. 5B).

Each of these requests is sent to the corresponding engine. This latter physically executes the request (a engine thus carries out the real connection with the material), then sends back an acknowledgement status to the tree structure which launches the next request, etc . . .

The present software architecture permits, in the case of appearance of a new communication media, to create quite simply a new engine, whilst conserving the rest of the software architecture.

The software oriented end user applications, such as the phone book or the launcher, permit, by configuring, launching a certain number of operations in an automated way.

Thus, in the case for example of an automobile manufacturing plant in which a robot on the assembly line needs repair, the detection of the need for repair is sent to the "launcher" engine which "alerts" the phone book. The phone book, principally constituted by a personnel database assembled in distribution lists, will then automatically carry out, by means of the server 1, the notification of all personnel charged with the maintenance in the case in question. The carried out notifications could be of different types (telephonic with voice tree structure, fax, radio messaging) and will hence automatically be directed toward the corresponding engine, the communication between application software and engines taking place exclusively over the network.

According to an additional characteristic of the invention, the telecommunication server 1 is preferably provided with at least one communication interface with an external computer unit 18 allowing, by means of dynamic exchanges of data and/or of commands of the type known by the designation DDE or OLE, the control and programming of said server 1 by applications that are standard in commerce. Thus, these applications often have an opening to the external world of the DDE client type (dynamic data exchange), or of the OLE type (object linking and embedding) or the like.

The possible original application for the telecommunication server 1 and which takes part in the possibilities of transport of "sound packets" on the Ethernet can consist in the provision of sounding equipment permitting the distribution of voice messages or alerts or surveillance in the framework of sites such as for example airports, industrial sites or sites at risk.

Thus the invention also has for its object, as shown in FIGS. 2 and 6 of the accompanying drawings, a device for sounding and for audio surveillance of public or private places, characterized in that it is constituted by at least one local functional unit 20 connected, on the one hand, to the telecommunication server 1 described above by means of an interface 20' of local computer connection 12, for example of the Ethernet type, for the transmission of packets and, on the other hand, with at least one microphone 21 and at least one loudspeaker 22. Said local functional unit 20 comprising assembly and disassembly means 23 for the packets, including means 23' for compression/decompression of data, synchronization means 24, means 25 for digital/analog coding/decoding and bi-directional amplification means 26 for analog signals connected to said microphone and to said loudspeaker.

Of course, an individual computer or standard PC provided with suitable audio and software means could render in part the same service.

But the mentioned device consists in the provision of a proprietary sounding unit incorporating bi-directional low frequency amplification means permitting as well sending voice and music as surveillance of intrusion by unauthorized persons into a location under surveillance. This solution according to the invention is much more compact, less costly, more reliable (no fan, . . . ) and ready to use (no starting the PC on hard disk, . . . ).

According to one characteristic of the invention, shown also in FIG. 2 of the accompanying drawings, the server 1 can be connected by means of at least one link or data bus 12, to at least one individual computer 18' associated with a telephone set connected to the server 1 or provided with at least one audio communication means, so as to supply to said at least one individual computer 18', and as may be to the associated telephone set, services of the type of those supplied by a PBX such as for example call set up, the identification of the caller, call hold, call forward, call transfer, conference or the like, as well as services resulting in a coupling of the telephone/data type such as for example call history and the call duration recording, phone book, messaging services or the like.

One of the possibilities described above consists in permitting a multimedia PC, provided with an Ethernet card and audio means of the type known under the designation "Sound blaster" by the company Creativ Labs or others, to have access via the local area network (LAN) of the Ethernet type, to all the communication facilities supplied by the telephone application integrated into the telecommunication server 1 and to the applications of the CTI type on PC, which is to say: history of communications, duration, phone book, taxation, messaging, etc . . .

In this case, the conventional telephone set and its analog line are suppressed and replaced by voice functions of the multimedia PC and by the Ethernet connection.

Finally, the invention also has for its object, as shown in FIG. 7 of the accompanying drawings, a multi-support private telecommunication network between at least two enterprises, characterized in that it comprises at each end of the connection to the said network a telecommunication server 1 according to the invention, comprising at least one module 16 interfacing with at least one network 17 for packet communication, associated with the module 16' performing bi-directional conversion of multiplexed circuit switched voice frames into packet switched voice frames made up of suitable signal processors, which ensure the interconnection with said packet switching network 17, of the different digital and/or analog interfacial modules 7 and 13 connected to the transmission lines 8–11, 14 and 15 and/or to the bus or local connections 12 internal to each enterprise connected to said telecommunication network by means of a server 1, supplying the connection means and signalling means peculiar to the network 17 in question and, with the association of the different modules 3, 4, 5, 7 and 13 of said servers 1 in question, the whole set of services of the PBX type.

It is thus possible, thanks to the telecommunication server 1 according to the invention, to build a private interenterprise communication network via the Internet/Intranet network, using only at each end of the transmission network a server 1 and thereby permitting supplying to the enterprises connected to the Internet/Intranet network, on the one hand a system integrated voice gateway as well as the signalling and interconnection means associated with each of these networks (call set up-connection . . . ) and on the other hand, all the services provided by state of the art PBX and an opportunity to reduce significantly the cost of their communications.

The server 1 has, as already indicated, an architecture which combines an assembly of hardware and software means (applications) in a same compact unit.

The voice gateway IP/ISDN preferably made up of one or several signal processors, is associated with a hardware switching matrix. The association of the two entities enables the possibility of interconnecting with the TCP/IP network, all the analog or digital interfaces integrated into the server, and to transmit via this network all the services ordinarily provided by a state of the art PBX. Among the supplied services can be cited: the handling and the supervision by a PC of multiple lines, call-setup-hold-transfer-forward call between several PCs and telephone terminals, multi-party voice and data conferences between sites interconnected at each end by the server 1 of the present invention and messaging/user guidance thanks to the modules 5 for transfer of voice prompts.

The telecommunication server 1 according to the present invention can also be used as a direct gateway between the telephonic communication means, materialized by the telephone terminals 9" or computer units 18' equipped with an audio card and a handset or a telephone headset, connected internally to the server 1 by means of a bus of the ISDN or Ethernet type, and the Internet/Intranet networks, which networks link together the two servers 1 connected at each end of the telecommunication network (see FIG. 2 and FIG. 7).

The evident advantage of such an arrangement is to permit enterprises to drastically cut their communication expenditures, at the price of a slight reduction in voice transmission quality and to provide through the Internet network, at each end, the whole set of services usually offered by a state of the art PBX.

Another potentiality of the telecommunication server 1 according to the invention is its capacity to advantageously provide services of the PBX or intercommunication type (such as conference, line supervision, manager/secretary filtering) particularly valuable features in the communication field for small and medium sized enterprises, without being compelled to use "dedicated" telephone sets, thanks to the proprietary telephony applications, integrated in said server 1 and the judicious arrangement of the messages available in the ISDN protocol.

The invention also has for its object a communication and a signalling process, granting a standard ISDN telephone set, connected to said telecommunication server, the ability to perform all the functions of a PBX and of an intercommunication system (supervision of the internal and external line status connected to the telecommunication server 1, call setting up-call transferring-holding a call, call forwarding manager/secretary filtering or the like).

This communication process, between a telecommunication server 1 and a standard ISDN terminal 9", connected to this latter, consists on the one hand in sending to said ISDN terminal 9", provided with suitable display means and capable of processing messages of the communication protocol ISDN, an. informative frame containing, in a field of the message, data relative to the state of the lines connected to the server 1, of the server 1 and/or of the ISDN terminal 9" in question, to display continuously these data at the level of said ISDN terminal 9" until a new informative frame is sent with a message ordering the modifying of the display, and in emitting a new informative frame at each change of state of a line connected to said server 1 and, on the other hand, to transmit from said ISDN terminal 9" towards said server 1, in an ISDN frame emitted from said terminal, data concerning one or more buttons activated by the user at the level of said terminal.

More precisely, the use of these mentioned services, particularly for the supervision of the line status, supposes that the standard ISDN terminals connected to the telecommunication server 1 will be provided with buttons and display means, for example of the LCD type (liquid crystal display), and capable of processing informative messages called "info" of the ISDN protocol. The display of information concerning the state of the server 1, of the lines and of the telephone set in question at the level of said telephone sets is carried out by the telecommunication server 1 thanks to means incorporated in said server and by judicious use of the "info" frame existing in the ISDN protocol level 3, which "info" frame contains the text to be displayed in the "display" field of the message. The ISDN terminal displays the text and maintains it until a new message is sent to it. After local use, for example programming the terminal, the latter text is again displayed.

In the case of supervision of internal and external lines, the text sent by the telecommunication server 1 to the ISDN terminal in the "display" field of the "info" message contains for each supervised telephone line a "line identification element" and its "current state". Upon each change of state of a telephone line, the telecommunication server 1 sends a new "display" element.

The invention also permits, for example, to filter a principal ISDN terminal called a "manager station", by a secondary ISDN station called a "secretarial station", it being understood that the difference of the number of managers per secretary or vice versa, can be programmed and that in addition to the private channel and the filtered channel of the manager, there exists a privileged channel between each manager and his secretary.

The services described above advantageously take profit from software potentialities of the telecommunication server 1 and the judicious use of the messages available in the ISDN protocol.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. Telecommunication server for enterprises, characterized in that it is constituted, on the one hand, by a central switching assembly (2) comprising a management module (3) with a non-dedicated microprocessor (3') serving as the platform for a standard multi-tasking computer operating system, supervising in real time the switching of multiplexed frames, a module (4) forming a real time switching module for digitized channels and a module (5) for transfer of voice messages, interconnected by at least one link or internal bus (6, 6', 6") for communication and transfer, on the other hand, by modules (7) interfacing with the lines (8, 9, 10, 11) for analog and/or digital transmission and/or with one or more links or computer network buses (12), internal to the enterprise, and finally by modules (13) interfacing with transmission lines (14, 15) connected to the public communication networks, analog (14') and digital (15'), these modules being integrated into a single structural assembly, and in that an executable software that can run on said server (1) under the control of the multi-tasking operating system comprises, on the one hand, predefined applications, particularly an application ensuring the processing and management of internal lines (8, 9, 10, 11, 12) and external lines (14, 15) in relation to the different modules (7, 13) of data and/or voice communication interface, in response to external or internal requests, on the other hand, programmable applications adapted as specified by a user and executed either internally by said server (1), or externally by one or several suitable computer units (18) connected to said server (1), by using predefined applications, and, finally, by voice channels, of which each is made up of a succession of internal operations of the voice or telephone type and of external operations based on requests and/or awaited actions and which can be started and stopped independently of each other.

2. Telecommunication server according to claim 1, characterized in that it also comprises a module (16) interfacing with at least one external packet switching network (17) associated with module (16') for bi-directional conversion of multiplexed circuit switched voice frames into packet switched voice frames.

3. Telecommunication server according to claim 1, characterized in that the module (5) for the transfer of voice messages searches, transfers and/or processes, automatically and autonomously, files with "sound" content, as a function of instructions stored in a memory (3") for signalization and control of the microprocessor (3') of a management unit (3).

4. Telecommunication server according to claim 1, characterized in that different executable software communicate between themselves by means of an intertasking communication software interface and telephonic oriented software interfaces and oriented software interfaces for voice applications and are used, in parallel, partially or completely by said server (1) or by at least one computer unit (18) or a suitable personal computer or connected to said server (1) by a connection or a communication bus (12) using a local computer network connected to said server (1).

5. Telecommunication server according to claim 1, characterized in that it is provided with at least one interface for communication with an external computer unit (18) permitting, by means of dynamic exchanges of data and/or of control of the type known as Dynamic Data Exchange or Object Linking and Embedding, the piloting and programming of said server (1).

6. Telecommunication server according to claim 1, characterized in that it is connected by means of at least one computer link or bus (12) to at least one individual computer (18') associated with a telephone set connected to the server (1) or provided at least with audio communication means, so as to supply to said at least one individual computer (18'), and as the case is an associated telephone set, services of the type supplied by a Private Branch Exchange, as well as services resulting from a coupling of the telephone/computer type.

7. Multi-support private communication system between at least two enterprises, comprising:
    a network having a connection between the at least two enterprises;
    at each end of the connection to said network a telecommunication server (1),
    each telecommunication server having a central switching assembly (2) comprising a management module (3) with a non-dedicated microprocessor (3') serving as the platform for a standard multi-tasking computer operating system, supervising in real time the switching of multiplexed frames, a module (4) forming a real time switching module for digitized channels and a module (5) for transfer of voice messages, interconnected by at least one link or internal bus (6, 6', 6") for communication and transfer, on the other hand, by modules (7) interfacing with the lines (8, 9, 10, 11) for analog and/or digital transmission and/or with one or more links or computer network buses (12), internal to the enterprise, and finally by modules (13) interfacing with transmission lines (14, 15) connected to the public communication networks, analog (14') and digital (15'), these modules being integrated into a single structural assembly, and in that an executable software that can run on said server (1) under the control of the multi-tasking operating system comprises, on the one hand, predefined applications, particularly an application ensuring the processing and management of internal lines (8, 9, 10, 11, 12) and external lines (14, 15) in relation to the different modules (7, 13) of data and/or voice communication interface, in response to external or internal requests, on the other hand, programmable applications adapted as specified by a user and executed either internally by said server (1), or externally by one or several suitable computer units (18) connected to said server (1), by using predefined applications, and, finally, by voice channels, of which each is made up of a succession of internal operations of the voice or telephone type and of external operations based on requests and/or awaited actions and which can be started and stopped independently of each other, and comprising at least one module (16) interfacing with at least one packet switching network (17), associated with a module (16') performing bi-directional conversion of multi-plexed circuit switched voice frames into packet switched voice frames made up of suitable signal processors, which ensure the interconnection with said packet switching network (17) of the different modules (7 and 13) digitally and/or analogically interfaced, connected to the transmission lines (8–11, 14 and 15) and/or to the bus or local connections (12) internal to each enterprise connected to said telecommunication network by means of said server (1), supplying a connecting means and signalization means peculiar to the network (17) in question and with the association of the different modules (3, 4, 5, 7 and 13) of said servers (1) in question, the whole set of the services of the Private Branch Exchange.

8. Process for communication between a telecommunication server and a ISDN terminal, connected to said telecommunication server, comprising the steps of:

utilizing a telecommunication server having a central switching assembly (2) comprising a management module (3) with a non-dedicated microprocessor (3') serving as the platform for a standard multi-tasking computer operating system, supervising in real time the switching of multiplexed frames, a module (4) forming a real time switching module for digitized channels and a module (5) for transfer of voice messages, interconnected by at least one link or internal bus (6, 6', 6") for communication and transfer, modules (7) interfacing with the lines (8, 9, 10, 11) for analog and/or digital transmission and/or with one or more links or computer network buses (12), internal to the enterprise, and modules (13) interfacing with transmission lines (14, 15) connected to the public communication networks, analog (14') and digital (15'), these modules being integrated into a single structural assembly, an executable software that can run on said server (1) under the control of the multi-tasking operating system comprises, on the one hand, predefined applications, particularly an application ensuring the processing and management of internal lines (8, 9, 10, 11, 12) and external lines (14, 15) in relation to the different modules (7, 13) of data and/or voice communication interface, in response to external or internal requests, on the other hand, programmable applications adapted as specified by a user and executed either internally by said server (1), or externally by one or several suitable computer units (18) connected to said server (1), by using predefined applications, and by voice channels, of which each is made up of a succession of internal operations of the voice or telephone type and of external operations based on requests and/or awaited actions and which can be started and stopped independently of each other;

sending to said ISDN terminal (9"), provided with suitable display means and capable of processing messages of the communication protocol ISDN, a informative frame containing, in a field of the message, data relative to the state of the lines connected to the server (1), of the server (1) and/or of the ISDN terminal (9") in question, in displaying permanently these data at the level of said ISDN terminal (9") until the sending of a new informative frame with a modified message field to be displayed, and in emitting a new informative frame at each change of state of a line connected to said server (1); and transmitting to said ISDN terminal (9") towards said server (1), in an ISDN frame from said terminal, data concerning one or more buttons activated by the user on said terminal.

* * * * *